Patented Mar. 18, 1924.

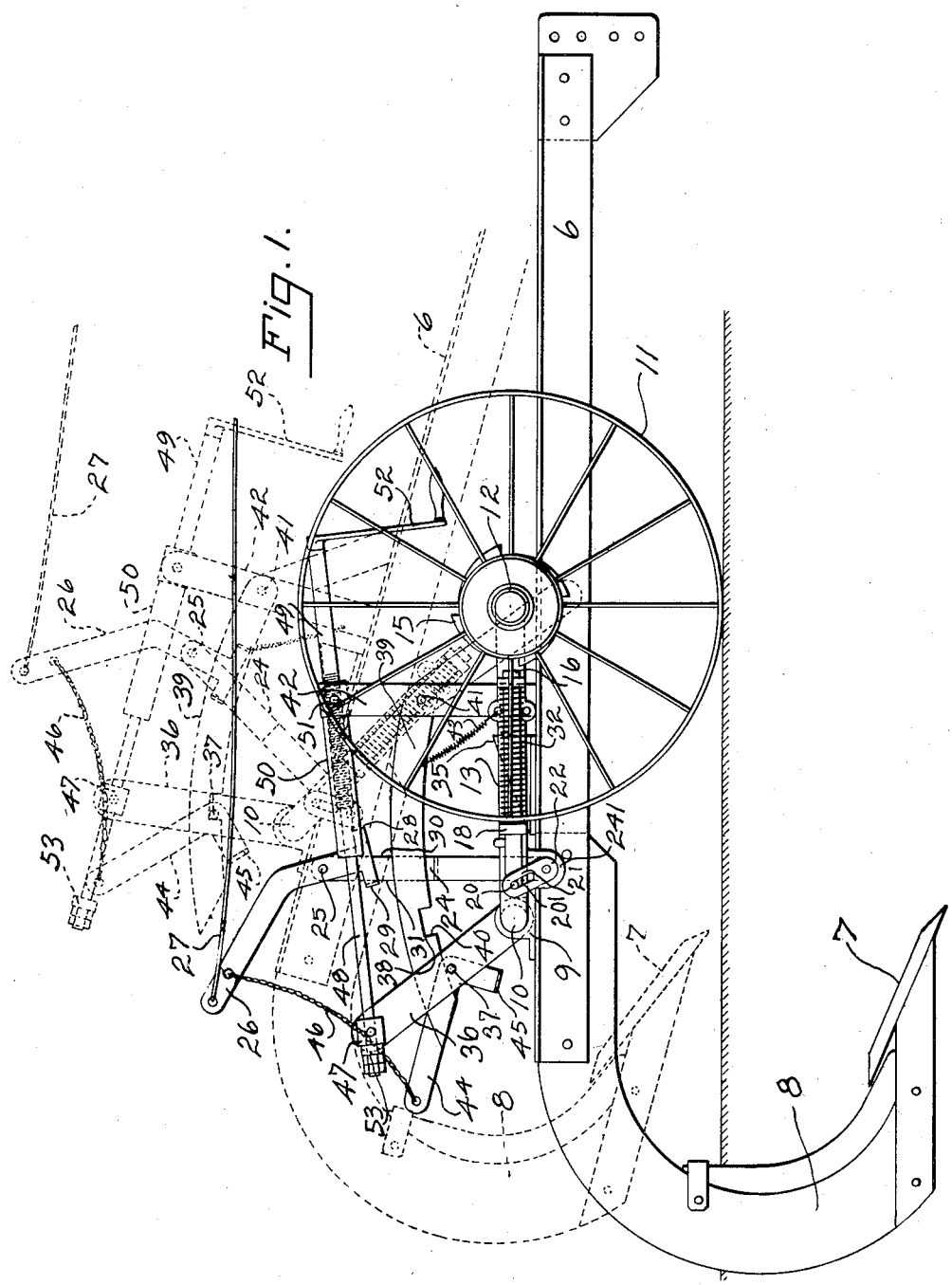

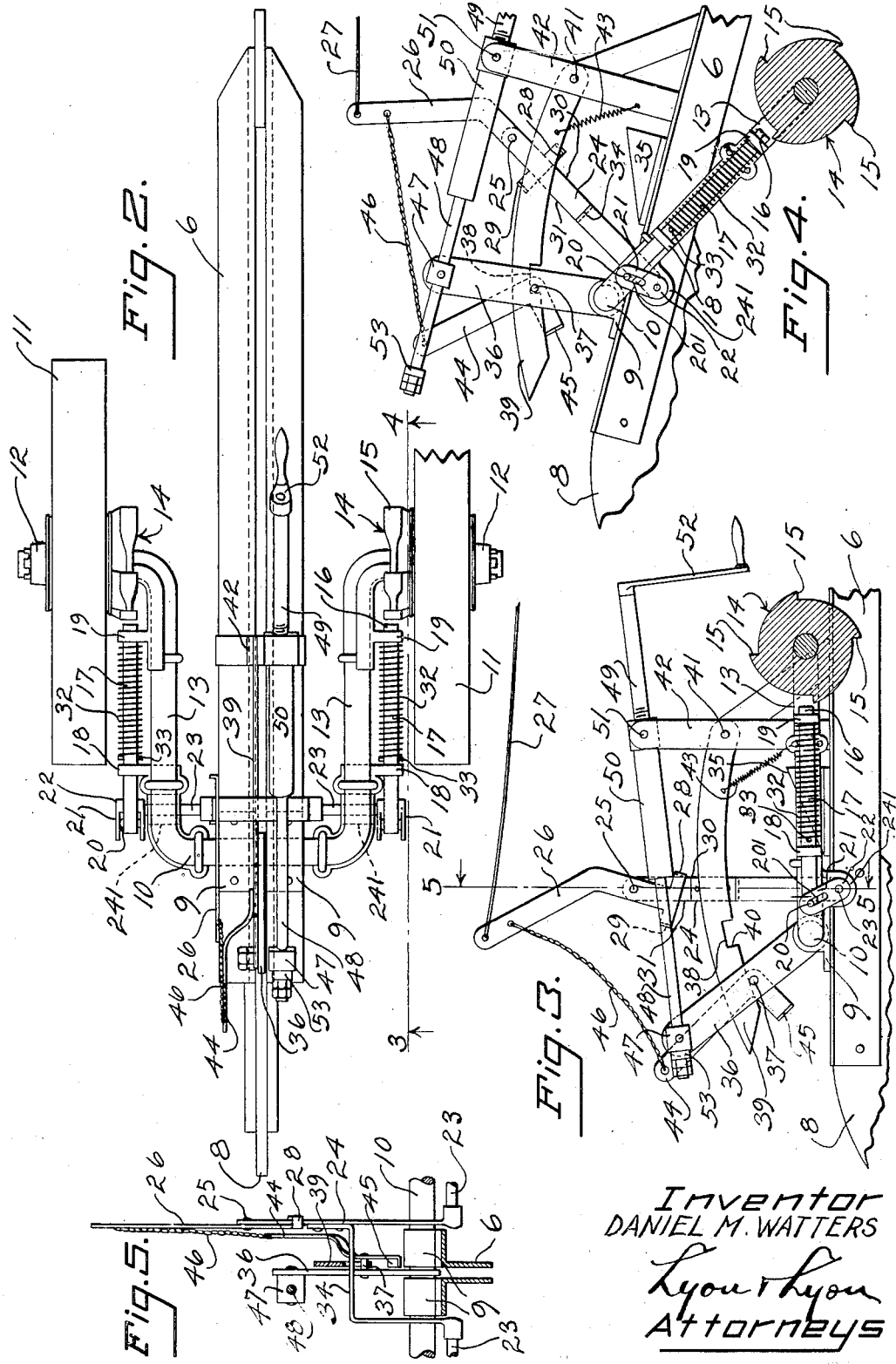

1,487,413

UNITED STATES PATENT OFFICE.

DANIEL M. WATTERS, OF LOS ANGELES, CALIFORNIA, ASSIGNOR TO THE KILLEFER MANUFACTURING COMPANY, OF LOS ANGELES, CALIFORNIA, A CORPORATION OF CALIFORNIA.

POWER LIFT FOR GROUNDWORKING IMPLEMENTS.

Application filed June 14, 1922. Serial No. 568,204.

*To all whom it may concern:*

Be it known that I, DANIEL M. WATTERS, a citizen of the United States, residing at Los Angeles, in the county of Los Angeles and State of California, have invented a new and useful Power Lift for Groundworking Implements, of which the following is a specification.

This invention relates to mechanism for raising and lowering ground working tools such as plows, chisels and the like, turning of the ground wheels being utilized for lifting the tools out of the ground when it is desired to discontinue the plowing or cultivating operation.

An object of the invention is to provide a novel construction for effecting the aforestated result.

This invention is a modification of that disclosed in my copending application, Serial No. 424,083, filed November 15, 1920.

The accompanying drawings illustrate the invention:

Figure 1 is a side elevation of an implement embodying the invention, the frame and the parts carried thereby being shown in solid lines in position for plowing, and being shown in broken lines in plow-elevated positions.

Fig. 2 is a plan view of Figure 1, a portion of one of the ground wheels being broken away to contract the view.

Fig. 3 is an elevation, partly in section, from the line indicated by 3—4, Figure 2.

Fig. 4 is an elevation, partly in section, from the line indicated by 3—4, Figure 2.

Fig. 5 is an elevation, partly in section, from the line indicated by 5—5, Figure 3.

There is provided a frame 6 of any suitable construction supporting ground working tools indicated at 7. The tools 7 are connected with the frame 6 by standards 8. The frame 6 is provided with bearings 9 in which is journaled a crank axle 10. The opposite ends of the axle 10 are supported on ground wheels 11 and the hubs 12 of said ground wheels constitute fulcrums upon which the axle turns, the crank arms of the axle being indicated at 13.

Mounted on the axle portions that are concentric with the hubs 12 are ratchet wheels 14, the teeth thereof being indicated at 15. These wheels 14 are suitably secured to the hubs 12. I provide means associated with the crank axle for connecting the crank axle at will with the ratchet wheel and these means are as follows: The teeth 15 are adapted to be engaged by detents 16 formed by the free ends of members 17 movably mounted on the cranks 13. In this instance the members 17 are rods slidably mounted in bearings 18, 19 secured to the cranks 13. The rear ends of the rods 17 are provided with shoulders or pivots 20 which engage slots 201 in jaws 21 of arms 22. The arms 22 are fixed on the outer ends of rock shafts 23 which are connected at their inner ends by a crank arm 24 and are journaled in bearings 241 on the cranks 13.

Pivotally connected at 25 to the crank arm 24 is an operating member 26, to the upper end of which is connected an operating line 27 that passes forwardly to within reach of the operator of the tractor, not shown, by which the implement is drawn over the ground. The member 26 constitutes a lost motion device and is provided with a pair of spaced shoulders 28, 29 adapted, when the crank 24 and member 26 are relatively moved to different positions, to engage the opposite edges 30, 31, respectively, of the crank arm 24 to limit movement of the member 26 relative to the arm 24. The reason for this lost motion will appear hereinafter. The rods 17 are normally urged rearwardly out of engagement with the ratchet wheels 14 by coil springs 32 surrounding said rods, the forward ends of said springs seating against the bearings 19 and the rear ends of said springs seating against shoulders 33 on the rods 17.

From the foregoing it will be clear that, when the operator desires to have the frame 6 raised from the solid line position shown in Figure 1 to the dotted line position, he will pull on the operating line 27 so as to cause the rods 17 to engage the rotating ratchet wheels 14, whereupon the rods 17 together with the cranks 13 and the frame will be caused to rotate with the ratchet wheels.

When the frame has been raised to the desired height, it is necessary that the detents 16 be disengaged from the ratchet wheels 14 and to effect this a shoulder 34 formed by a cross member of the crank arm 24 engages an abutment 35 mounted on the upper face of the frame 6. In Figure 4 the shoulder 34 has engaged the abutment 35 and has receded therefrom.

It will now appear that, when the detents 16 are thus retracted by engagement of the shoulder 34 with the abutment 35, the frame would tend to drop to position to again bring the ground working tools into contact with the earth. To hold the frame in elevated position until the operator desires to drop it, after the detents 16 are retracted, the following construction is provided:

The crank of the axle 10 is provided with a fixed arm 36 which is provided with an abutment 37 formed by a portion of a pin. The abutment 37 is adapted to be received in a notch 38 in a link 39, the rear edge of the notch 38 constituting a shoulder 40 against which the abutment 37 comes to rest when the frame is in the elevated position as in broken lines in Figure 1 and solid lines in Figure 4.

The link 39 is pivoted at 41 to a standard 42 mounted on the frame 6, and gravity tends to swing the link downwardly. A spring 43 is connected at one end to the link 39 and at its other end to the standard 42 so as to aid gravity in swinging the link 39 downwardly to insure that the abutment 37 will engage and not accidentally slip from the notch 38. Such engagement takes place before the shoulder 34 engages the abutment 35. This can be clearly seen in Figure 4 where the shoulder 34 has already engaged the abutment 35 and retracted the detents 16 and the frame is held elevated by the link 39 engaging the abutment 37.

In order to disengage the link 39 from the pin or abutment 37, said pin is the fulcrum of a lever 44 which is provided with a shoulder 45 adapted, when the lever 44 is pulled forwardly, to engage the bottom edge of the link 39 so as to swing said link upwardly. This link-engaging movement of the lever 44 is effected by the operator pulling on the line 27, since the member 26 and lever 44 are connected by a chain 46 or other suitable means. When the connection 46 is taut and the abutment 37 is engaged by the shoulder 40, the shoulder 28 is spaced from the crank arm 24, as in Figure 4, so that a pull on the line 27 will operate the lever 44 and not the crank arm 24. When the frame is in lowered position and the shoulder 28 engages the crank arm 24, as in Figure 3, the connecting member 46 is slack so that a pull on the line 27 will operate the crank arm 24 and not the lever 44.

When the frame is being lowered, it is essential that means be provided to limit the lowering movement so as to limit the depth of penetration of the ground working tools. In this particular instance I effect this by the following construction:

The arm 36 is provided with a shoulder 47 which slidably engages the smooth shank 48 of a screw 49 engaging a nut 50 that is pivoted at 51 to the upper end of the standard 42. The screw 49 is provided at its forward end with a hand crank 52. The rear end of the screw 49 is provided with a stop 53 which engages the shoulder 47 when the link 39 is thrown out of engagement with the abutment 37, as in Fig. 3. It is evident that the degree of penetration of the ground working tools may be regulated by turning the crank 52 so as to move the stop 53 nearer to or farther from the nut 50.

The invention operates as follows: Assuming that the parts are in the positions indicated in broken lines in Figure 1 and in full lines in Figure 4, and that the operator desires to lower the ground working tools, he will pull on the line 27, thus releasing the abutment 37 from the link 39. This permits the frame to drop to the position shown in full lines in Figures 1 and 2. If now the operator desires to raise the ground working tools, assuming that the implement is being drawn over the earth, he again pulls on the line 27, thus causing the shoulder 28 to engage the crank arm 31 as in Figure 3. Continued pulling on the line 27 will thereupon swing the crank arm 31 forwardly so as to move the detents 16 into engagement with the ratchet wheels 14, whereupon the frame will be elevated. As the frame continues to rise the abutment 37 engages the notch 38 in the link 39 and immediately thereafter the shoulder 34 strikes the abutment 35, thus retracting the detents 16 and permitting the arm 36 to swing rearwardly until the shoulder 40 and abutment 37 engage. The shoulder 29 limits rearward swinging of the member 26 relative to the crank arm 24 as clearly indicated in broken lines in Figure 1 and in full lines in Figure 3.

From the foregoing it will be understood that I have provided a construction whereby the operator is enabled by pulling on a single operating line to effect both raising and lowering of the ground working tools.

I claim:

1. In an implement, the combination of a frame, a crank axle supporting the frame, ground wheels journaled on the axle, ground-working tools supported by the frame, a ratchet wheel operated by one of the ground wheels, an arm mounted on the crank axle, a link having a shoulder, a standard rigid with the frame to which said link is pivoted, means cooperating with the shoulder of the link to hold the arm with the crank axle turned to a predetermined position, means to release the arm at will, means associated with the crank axle for connecting the crank axle at will with the ratchet wheel and having a shoulder, and an abutment on the frame adapted to engage the shoulder when the crank axle is turned to said predetermined position to retract the last named means.

2. In an implement, the combination of a frame, a crank axle supporting the frame, ground-wheels journaled on the axle, ground-working tools supported by the frame, a ratchet wheel operated by one of the ground wheels, an arm mounted on the crank axle, a standard rigid with the frame, a link pivotally supported by said standard, said link having a shoulder, means cooperating with the shoulder of the link to hold the arm with the crank axle turned to a predetermined position, means to release the arm at will, means associated with the crank axle for connecting the crank axle at will with the ratchet wheel and having a shoulder, an abutment on the frame adapted to engage the shoulder when the crank axle is turned to said predetermined position to retract the last named means, and means to limit the movement of the arm after it has been released.

3. In an implement, the combination of a frame, a crank axle supporting the frame, ground wheels journaled on the axle, ground-working tools supported by the frame, an arm mounted on the crank axle, a link pivotally supported from a part which is rigid with the frame, said link having a shoulder, means cooperating with the shoulder of the link to hold the arm with the crank axle turned to a predetermined position, means to release the arm at will, means controlled by the operator and operated by turning of one of the ground wheels to turn the crank axle to raise the frame, and means under the operator's control to adjustably limit the movement of the arm after it has been released.

4. In an implement, the combination of a frame, a crank axle supporting the frame, ground wheels journaled on the axle, ground-working tools supported by the frame, a standard mounted on the frame, a nut pivoted on the standard, a screw engaging the nut, an arm mounted on the crank axle and provided with a shoulder slidably engaging the screw, a crank at one end of the screw, and a stop on the other end of the screw to engage the shoulder.

5. In an implement, the combination of a frame, a crank axle supporting the frame, ground wheels journaled on the axle, ground-working tools supported by the frame, an arm mounted on the crank axle, a movably mounted link having a shoulder, an abutment on the arm engageable with the shoulder, and a lever pivoted to the arm and engageable with the link to move the link away from the abutment.

6. In an implement, the combination of a frame, a crank axle supporting the frame, ground wheels journaled on the axle, ground-working tools supported by the frame, means to connect at will the crank axle and one of the ground wheels to raise the frame, said means including a lost motion operating member, an arm mounted on the crank axle, a movably mounted link having a shoulder, an abutment on the arm engageable with the shoulder when the frame is in raised position to hold the frame from lowering, a member movably mounted on the arm and engageable with the link to release it from the abutment, and means connecting the lost motion member with the last named member, the spacing of the last named members when the frame is in lowered position permitting operation of the lost motion member without operation of the link-releasing member and when the frame is in raised position effecting operation of the link-releasing member by operation of the lost motion member.

7. In an implement, the combination of a frame, a crank axle supporting the frame, ground wheels journaled on the axle, ground-working tools supported by the frame, means to connect at will the crank axle and one of the ground wheels to elevate the frame, said means including a lost motion operating member, means operating when the frame has been elevated to a predetermined position to disconnect the last named means to permit the frame to drop, means operating when the frame has been elevated to said predetermined position to hold the frame from dropping when the frame-elevating means are released, a movably mounted member operatable to release the frame-holding means, and means connecting the lost motion member with the frame-releasing member, the spacing of the last named members when the frame is in lowered position permitting operation of the lost motion member without operation of the frame-releasing member and when the frame is in elevated position effecting operation of the frame-releasing member by operation of the lost motion member.

8. In an implement, the combination of a frame, a crank axle supporting the frame, ground wheels journaled on the axle, ground-working tools supported by the frame, a standard mounted on the frame, a screw shaft pivotally supported from said standard, an adjustable stop controlled by said screw shaft, an arm mounted on the crank axle and provided with means to engage said stop and thereby limit the movement of the arm, and a crank at one end of said screw shaft.

9. In an implement, the combination of a frame, a crank axle supporting the frame, ground wheels journaled on the axle, ground-working tools supported by the frame, a standard mounted on the frame, a link pivotally supported from said standard and having a shoulder, an arm mounted on the crank axle and having means cooperating with said shoulder to hold the arm with the crank axle turned to a predetermined position, means to release the arm at will, means controlled by the operator and operated by turning one of the ground wheels for raising the crank axle and the frame, and means to limit the movement of the arm after it has been released.

Signed at Los Angeles, Calif., this 6th day of June, 1922.

DANIEL M. WATTERS.